US011322935B2

(12) United States Patent
Farbiz et al.

(10) Patent No.: US 11,322,935 B2
(45) Date of Patent: May 3, 2022

(54) HIGH SPEED ESP PROTECTION CIRCUIT

(71) Applicant: Apple Inc., Cupertino, CA (US)

(72) Inventors: Farzan Farbiz, Mountain View, CA (US); Jaeduk Han, Seoul (KR); Praveen R. Singh, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/014,894

(22) Filed: Sep. 8, 2020

(65) Prior Publication Data

US 2022/0077679 A1 Mar. 10, 2022

(51) Int. Cl.
*H02H 9/04* (2006.01)

(52) U.S. Cl.
CPC .................................. *H02H 9/046* (2013.01)

(58) Field of Classification Search
CPC ..................................................... H02H 9/046
USPC .......................................................... 361/56
See application file for complete search history.

(56) References Cited

U.S. PATENT DOCUMENTS 6,621,673 B2 9/2003 Lin et al.
7,477,495 B2 * 1/2009 Dornbusch ......... H01L 27/0251 331/117 FE
8,654,488 B2 2/2014 Huitsing et al.
8,947,840 B1 * 2/2015 Milirud .................. H02H 9/046 361/56
2004/0109271 A1 * 6/2004 Takeda ................ H01L 27/0251 361/56
2008/0084641 A1 * 4/2008 Nagayama .......... H01L 27/0251 361/56
2010/0103571 A1 * 4/2010 Brown, Jr. ....... H03K 17/08104 361/56
2013/0285196 A1 10/2013 Dissegna et al.
2019/0305549 A1 * 10/2019 Muljono ................ H02H 9/041
2021/0044104 A1 * 2/2021 Domanski ............. H02H 9/046

FOREIGN PATENT DOCUMENTS

WO 2020005420 1/2020

* cited by examiner

*Primary Examiner* — Dharti H Patel
(74) *Attorney, Agent, or Firm* — Kowert, Hood, Munyon, Rankin & Goetzel, P.C.; Erik A. Heter

(57) ABSTRACT

An ESD protection circuit is disclosed. The ESD protection circuit is coupled between a first node and a second node that is coupled to an input of a functional circuit. A first protection circuit is coupled to the first node. The circuit further includes a first path and a second path. The first path includes a second protection circuit that is coupled to the second node, and is AC coupled to the first node. A second circuit path includes a third protection circuit, a resistor coupled between the third protection circuit and the first node, and a switch having a first terminal coupled to the resistor and the third protection circuit. A shunt circuit includes a transistor having a gate terminal coupled to the second terminal of the switch. The transistor, when activated, shunts current from the second node to ground.

20 Claims, 6 Drawing Sheets

HIGH SPEED ESP PROTECTION CIRCUIT

BACKGROUND

Technical Field

This disclosure is directed to electronic circuits, and more particularly, circuits for protection against electrostatic discharge (ESD) events.

Description of the Related Art

Transistors and other circuit elements in semiconductor substrates are continually being reduced in size as semiconductor fabrication technology advances. Such circuits are also increasingly susceptible to damage from electrostatic discharge (ESD) events, thus increasing the importance of the ESD protection implemented in integrated circuits. Generally, ESD events occur due to the accumulation of static charge, either on the integrated circuits themselves or on devices or other things that come into contact with the integrated circuits. Entities such as humans can also accumulate static charge and cause ESD events when coming into contact with an integrated circuit or its package.

A sudden discharge of the static charge can cause high currents and voltages that can damage the integrated circuit, and the potential for damage is higher with smaller feature sizes. There are various models for ESD events, which integrated circuit designers use to design and evaluate ESD protection circuits. For example, the charged device model (CDM) models the discharge of static electricity accumulated on the integrated circuit itself. The human body model (HBM) models the discharge of static electricity from a human body touch on the integrated circuit. Other models may be used for other types of ESD (e.g. the contact of various machines during manufacturing, etc.).

SUMMARY

An ESD protection circuit is disclosed. In one embodiment, an ESD protection circuit is coupled between a first node and a second node, the second node being coupled to an input of a functional circuit. A first protection circuit is coupled to the first node. Thereafter, the circuit is broken into two paths, a first path and a second path. The first path includes a second protection circuit that is coupled to the second node, and is AC coupled to the first node. A second circuit path includes a third protection circuit, and a resistor coupled between the third protection circuit and the first node. The second circuit path also includes a switch having a first terminal coupled to the resistor and the third protection circuit. A shunt circuit includes a transistor having a gate terminal coupled to the second terminal of the switch. Another terminal of the transistor is coupled to the second node, and when activated, shunts current from the second node to ground.

In one embodiment, the first path is a high speed path while the second path is a low speed path. The AC coupling in the first path is provided by a capacitor coupled between the first node and the second node. In the second path, the switch is configured to open responsive to an ESD event. A second shunt circuit is also coupled to the second path, the second shunt circuit including a transistor having a drain terminal coupled to the gate terminal of the first transistor, and a source terminal coupled to ground. Responsive to at least some ESD events, the transistor of the second shunt circuit is activated, thereby causing activation of the transistor of the first shunt circuit. In various embodiments, the first protection circuit is coupled to a first voltage supply node, while the second and third protection circuits (in the first and second paths, respectively) are coupled to a second voltage supply node.

BRIEF DESCRIPTION OF THE DRAWINGS

The following detailed description makes reference to the accompanying drawings, which are now briefly described.

Figure 1:
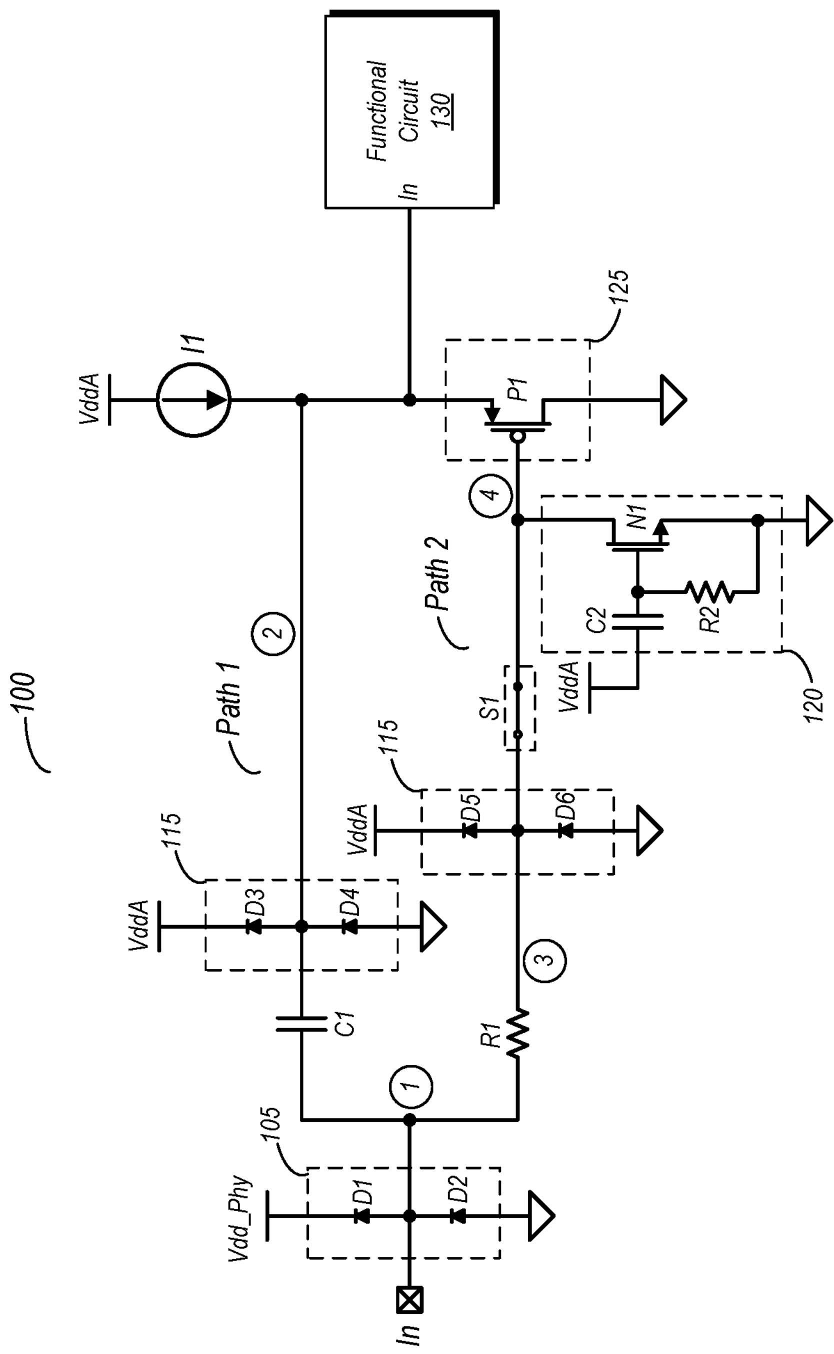
FIG. 1 is a schematic diagram illustrating one embodiment of an ESD protection circuit.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

The present disclosure is directed to an ESD protection circuit having separate high speed and low speed paths. In many typical ESD protection circuits, a single path is provided. These circuits may include a primary protection circuit and a secondary protection circuit. Each of the protection circuits may include a high side diode and a low side diode. The high side diode both the primary and secondary protection circuits may each include an anode coupled to a signal node (upon which the signal of interest is to be conveyed) and a cathode coupled to a supply voltage node. The low side diode may include a cathode coupled to the signal node and an anode coupled to a ground node. The primary protection circuit may dissipate a majority of the energy from an ESD event, with a secondary circuit dissipating the remaining energy.

In many of these types of ESD protection circuits, a current limiting resistor may be implemented in the signal path between the primary and secondary protection circuits. In lieu of a diode-based secondary protection circuit, some ESD protection circuits may implemented a snapback circuit, which includes a transistor coupled between a signal node and ground.

The circuits discussed above may face various challenges. For some technologies, the current limiting resistor may be relatively large to limit the voltage stress at the protected circuit. Furthermore, the current limiting resistor is implemented in the main signal path, which can both reduce signal quality and reduce signal bandwidth. With regard to the transistors used to implement snapback circuitry, special process engineering may be necessitated.

The present disclosure is directed to an ESD protection circuit that is divided into separate signal paths between its input and the input of the protected circuit. The circuit includes a primary protection circuit (implemented with diodes) coupled to an input to the circuit. Thereafter, the circuit is divided into two signal paths, a first, high-speed signal path, and a second, low speed signal path. The high-speed signal path is AC-coupled to the primary protection circuit/input node, e.g., having a capacitor implemented in the signal path, and further includes a diode-implemented secondary protection circuit. The signal node of the high-speed signal path is coupled to an input of a protected functional circuit. The low speed path includes a current limiting resistor in the signal path, and further includes another instance of a diode-implemented secondary protection circuit. The low-speed path also includes an isolation switch, which enables or disables the low-speed path depending on the functional requirement of the circuit. In the mission mode (e.g., normal operation, with power applied), if the receiving signal only contains high-speed information, this path can be disabled to save energy. The purpose of placing an isolation switch is not for ESD. However, its operation during ESD time-domain, and whether it stays in the open or closed state, influences the ESD results.

The ESD protection circuit disclosed herein may also include high-speed and low-speed shunting circuits. The high-speed shunting circuit may be implemented using a transistor (e.g., a PMOS device) having a source terminal coupled to the high-speed path and input node of the functional circuit, and a drain terminal coupled to a ground node. The low-speed path terminates on the gate terminal of the transistor of the high-speed shunting circuit. The low speed shunting circuit may include another transistor (e.g., an NMOS device) having a source terminal coupled to the ground node a drain terminal coupled to the gate terminal of the transistor of the high-speed shunting circuit. Responsive to certain conditions occurring during an ESD event, the transistor of the low-speed shunting circuit may activate, thereby pulling the low the gate terminal of the transistor of the high-speed shunting circuit and dissipating energy on the low-speed path. This in turn causes activation of the transistor in the high-speed shunting circuit, thereby pulling low the high-speed path/input to the functional circuit, and thereby dissipating energy on that node. Various embodiments of such an ESD circuit are now discussed in further detail.

FIG. 1 is a schematic diagram illustrating one embodiment of an ESD protection circuit. In the embodiment shown, ESD protection circuit 100 includes a high-speed path ('Path 1') and a low-speed path ('Path 2'). An input node is coupled to both of these circuit paths, and further coupled to primary protection circuit 105. In the embodiment shown, primary protection circuit 105 includes a first diode D1 and a second diode D2. The anode of D1 is coupled to the input node (Node 1), while the cathode of D1 is coupled to a first supply voltage node, Vdd_Phy. The anode of D2 is coupled to a ground node, while the cathode of D2 is coupled to Node 1. These diodes may, during an ESD event, clamp a voltage on the input node to within a diode-drop voltage (e.g., 0.7 volts) of either Vdd_Phy or ground. Furthermore, during an ESD event, primary protection circuit 105 may dissipate a majority of the energy from the event.

Path 1, the high-speed path in the embodiment shown, includes a capacitor C1 that provides AC-coupling between Node 1 and Node 2. A first instance of a secondary protection circuit 115, including diodes D3 and D4, is implemented in Path 1. Diode D3 includes an anode coupled to Node 2 and a cathode coupled to a voltage supply node, VddA. It is noted that VddA is a different supply voltage node than Vdd_Phy to which the cathode of D1 (in primary protection circuit 105). Diode D4 of this instance of secondary protection circuit 115 includes a cathode coupled to Node 2 and an anode coupled to ground. A current source, I1, is implemented between supply voltage node VddA and Node 2.

Node 2 of the Path 1 is also coupled to the input of the protected circuit, functional circuit 130. In the embodiment shown, functional circuit 130 may be any type of circuit for which ESD protection is desired. Such circuitry may include digital circuitry, analog circuitry, and/or mixed signal circuitry. ESD protection circuit 100 may, in protecting from damage against ESD event, may for example ensure that the gate oxide voltage of a transistor coupled to the input of functional circuit 130 does not exceed a breakdown voltage that could result in permanent damage.

Path 2 in the embodiment shown is a low-speed path. Whereas Path 1 provides a fast response of ESD events (e.g., high frequency components thereof), Path 2 dissipates energy of low frequency and longer lasting components of an ESD event. Path 2 includes a current limiting resistor R1, which is coupled between Node 1 and Node 3. Another instances of a secondary protection circuit 115, including diodes D5 and D6, is coupled to Node 3. In particular, an anode of D5 is coupled to Node 3 while a cathode of this diode is coupled to supply voltage node VddA. With respect to diode D6, its anode is coupled to the ground node, while its cathode is coupled to Node 3.

Path 2 also includes an isolation switch S1 coupled between Node 3 and Node 4 in Path 2. The isolation switch could be of any form of a switchable logic such as pass-gate CMOS or T-gate. This switch may be programmed to stay open or closed during the mission mode. Its state during ESD evets, however, is unpredictable since the supply rails VddA and Vdd_Phy are floating. If the switch happens to be in the open-state, Node 4 is isolated form Node 3, and the voltage stress does not transfer through the switch, which is the best case scenario for ESD. If the switch state is closed during ESD, Node 4 may follow Node 3, stressing the PMOS transistor gate, and possibly causing a permanent damage. The latter scenario is the worst-case condition. Either of the two conditions could happen depending on how much voltage has been coupled to the supply rails during floating conditions. Due to this unpredictability, design need to be able to withstand the ESD stress regardless of the state of the switch.

Node 4 of Path 2 is coupled to a gate terminal of transistor P1. This transistor implements shunt circuit 125. Transistor P1 in this embodiment is a PMOS device, having a source terminal coupled to Node 2 (and thus the input to functional circuit 130), a drain terminal coupled to ground, as well as the previously mentioned gate terminal that is coupled to Node 4. When activated, transistor P1 provides a shunt current path for Path 1, thereby allowing excess energy on Node 2 to be shunted to ground. The voltage present on Node 2 may also be pulled down to a near ground potential when P1 is active.

A second shunt circuit is coupled to Path 2. In particular, shunt circuit 120 includes a transistor N1 that includes a drain terminal coupled to Node 4 and a source terminal coupled to ground. When active, shunt circuit 120 provide a shunt current path between Node 4 and ground, and thus Node 4 may be pulled low. Transistor P1 of shunt circuit 125 may thus be activated responsive to activation of transistor N1 of shunt circuit 120.

Shunt circuit 120 also includes a capacitor C2 that is coupled between the gate of N1 and supply voltage node VddA. During some ESD events, VddA may rise, since this node is floating when not receiving power. If VddA rises to a sufficient level, the voltage on the gate terminal of N1 may also rise correspondingly to a point that the gate-source threshold voltage of that device is exceeded. Accordingly, N1 may activate and pull Node 4 low. Shunt circuit 120 also includes a resistor R2 coupled between the gate terminal of N1 and ground. This resistor provides a discharge path for the gate terminal of N1 subsequent to the initial rise of VddA.

Figure 2:
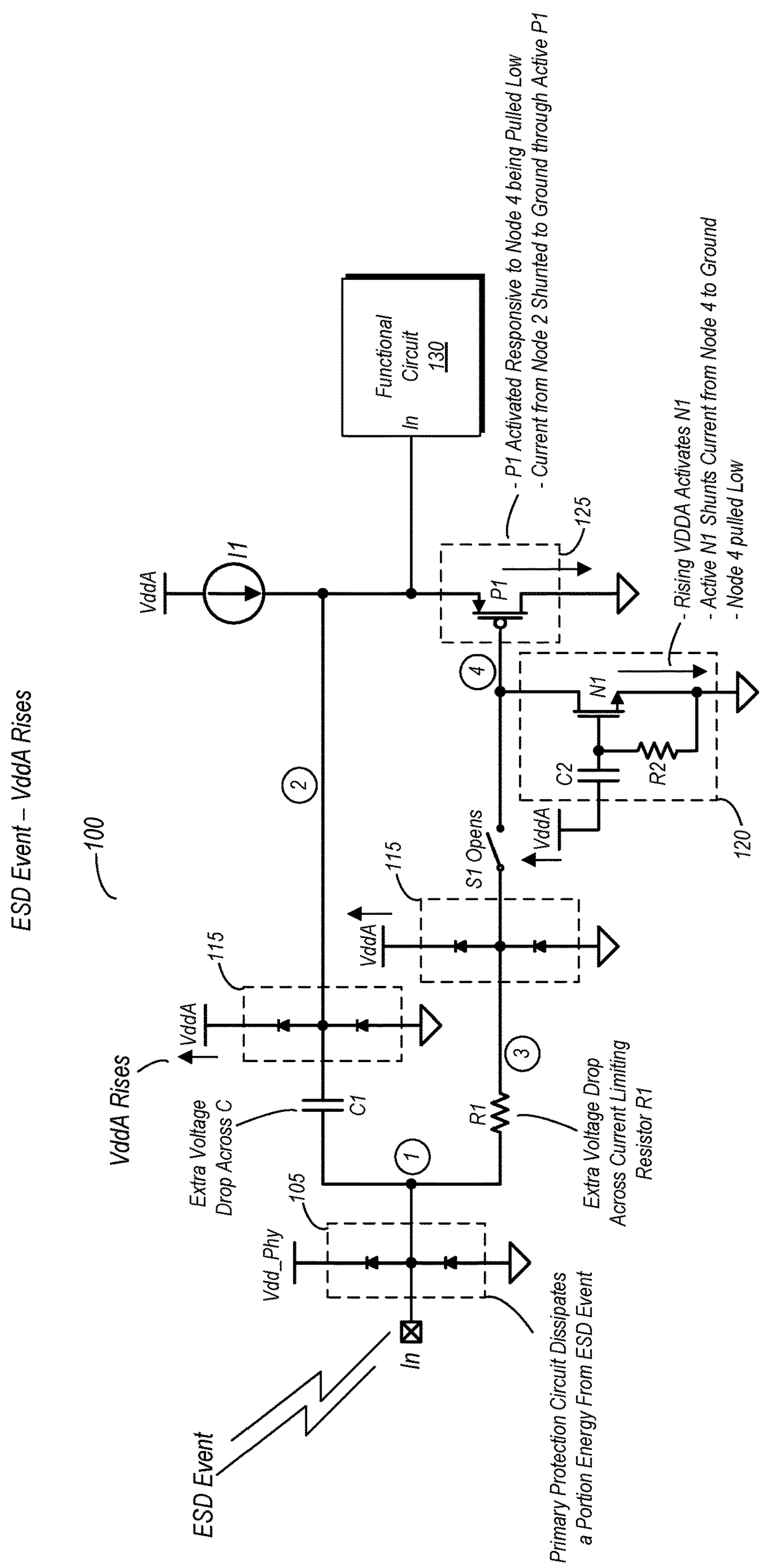
FIG. 2 is a schematic diagram illustrating operation of one embodiment of an ESD protection circuit in a first scenario.

FIG. 2 is a schematic diagram illustrating operation of one embodiment of an ESD protection circuit in a first scenario, in particular a scenario in which VddA rises. When the ESD event discharges energy to the input pin coupled to Node 1, primary protection circuit 105 may dissipate a majority of this energy by clamping the voltage on this node to within a diode drop voltage of either Vdd_Phy (via the high side diode) or ground (via the low side diode). The remainder of the energy from the ESD event is dissipated in the high-speed and low-speed paths, Paths 1 and 2, respectively.

In the high-speed path, capacitor C1 provides an extra voltage drop between Node 1 and Node 2. Depending on the voltage present on Node 2, the secondary protection circuit 115 may also clamp the voltage on this node to a voltage that is safe for functional circuit 130.

In the low-speed path, resistor R1 provides an extra voltage drop between Node 1 and Node 3. Additionally, switch S1 opens responsive to the ESD event, isolating Node 3 from Node 4. Additional energy on Node 3 may be dissipated by the secondary protection circuit 115 coupled thereto by clamping the voltage to a safe level.

The rising voltage on VddA may cause activation of transistor N1 of shunt circuit 120. The activation of N1 provides shunt current path between Node 4 and ground. Additionally, this causes Node 4 to be pulled low, toward the ground voltage. When Node 4 is sufficiently low, P1 is activated. When P1 is active, a shunt current path is provided between Node 2 (of the high speed path) and ground. Accordingly, energy is discharged to ground from Nodes 2 and 4, through P1 and N1, respectively.

Figure 3:
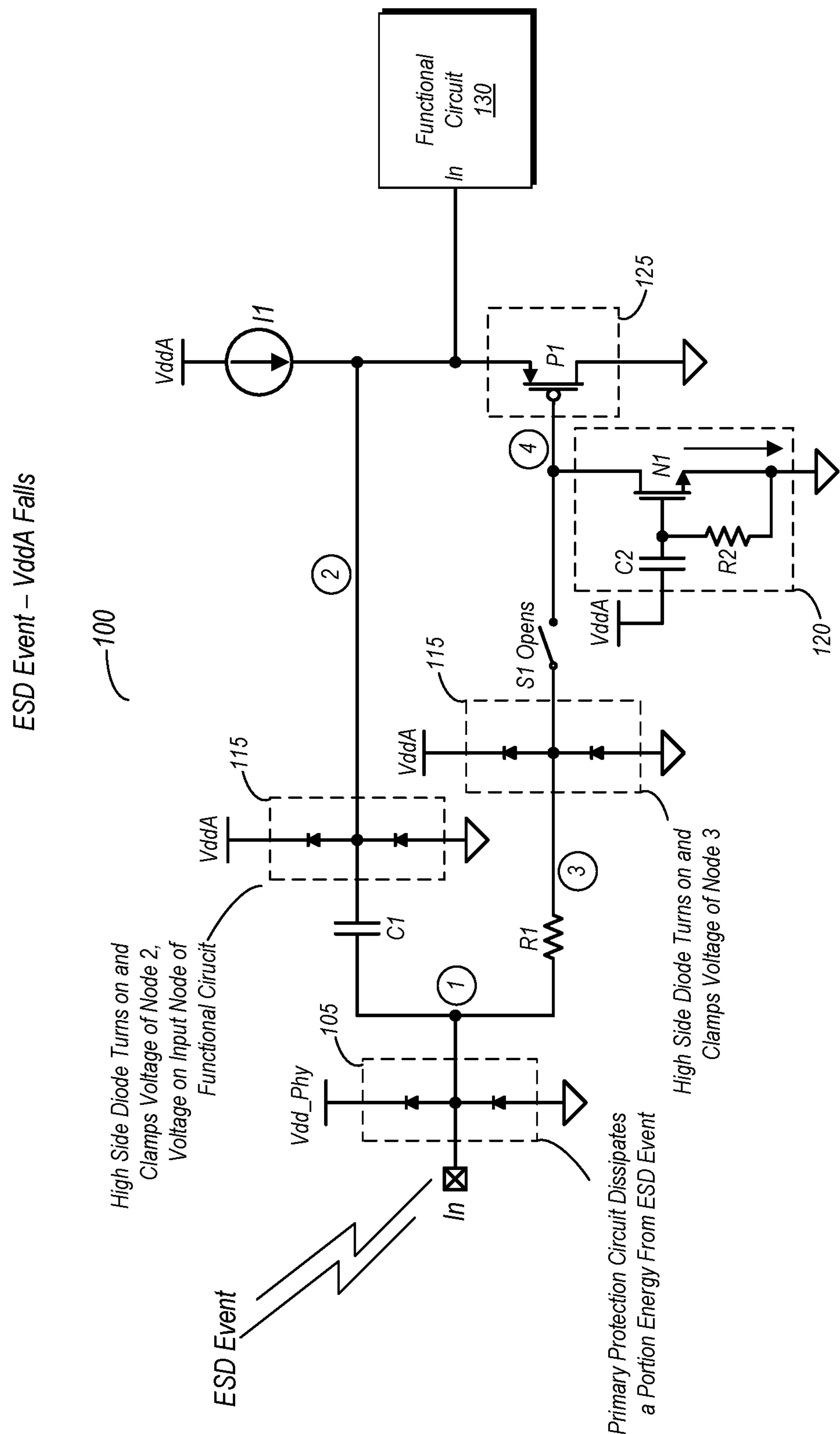
FIG. 3 is a schematic diagram illustrating operation of one embodiment of an ESD protection circuit in a second scenario.

FIG. 3 is a schematic diagram illustrating operation of one embodiment of an ESD protection circuit in a second scenario. In this scenario, VddA does not rise responsive to and/or during the ESD event. However, as in the previous scenario, a majority of the energy from the ESD event may be dissipated by the primary protection circuit 105 by clamping the voltage on Node 1 via either the high side or low side diode. Capacitor C1 and resistor R1 may function in a similar manner, with C1 dropping voltage between Node 1 and Node 3, while resistor R1 drops voltage between Node 1 and Node 3 (while also limiting DC current). Switch S1 may also open to isolate Node 3 from Node 4. On Node 2, the falling voltage on VddA may cause the high side diode of the corresponding secondary protection circuit 115 to activate, thereby clamping the Node 2 voltage. Similarly, on Node 3, the falling VddA causes activation of the high side diode in its secondary protection circuit 115. Thus, the voltage on Node 3 is clamped to a safe level.

Figure 4:
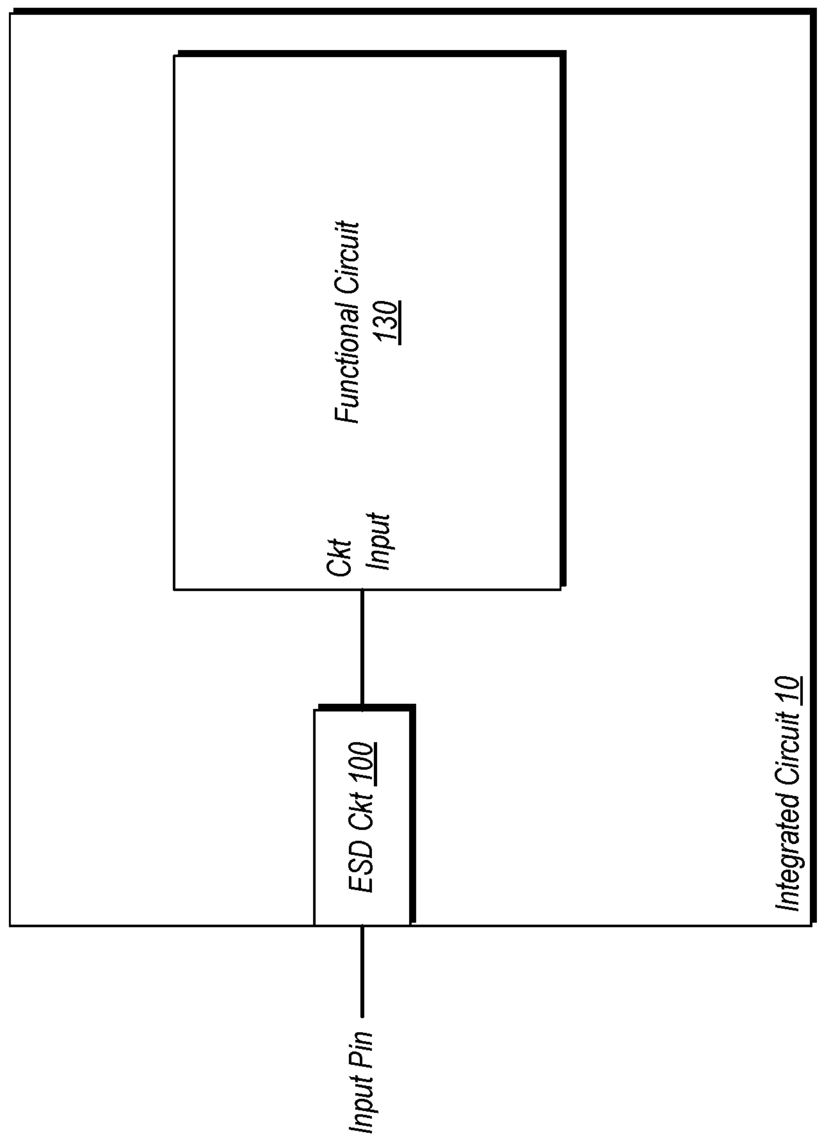
FIG. 4 is a block diagram of one embodiment of an integrated circuit having an ESD protection circuit.

FIG. 4 is a block diagram of one embodiment of an integrated circuit having an ESD protection circuit. More particularly, FIG. 4 illustrates one example of how an ESD protection circuit 100 may be implemented in an integrated circuit. It is noted that FIG. 4 presents a simplified example, and is not intended to be limiting.

As shown in FIG. 4, integrated circuit 10 includes an ESD circuit 100 that is coupled between an external input pin and an input to functional circuit 130. The input pin may be, for example, a pin of a surface mounted integrated circuit package, among other possibilities. More generally, the input pin may be any pin used to interface the internal functional circuit 130 to the external world. Since many ESD events originate externally to electronic packaging, placing an ESD protection circuit 100 between the external pin and the internal circuit may allow for protection of the latter.

Figure 5:
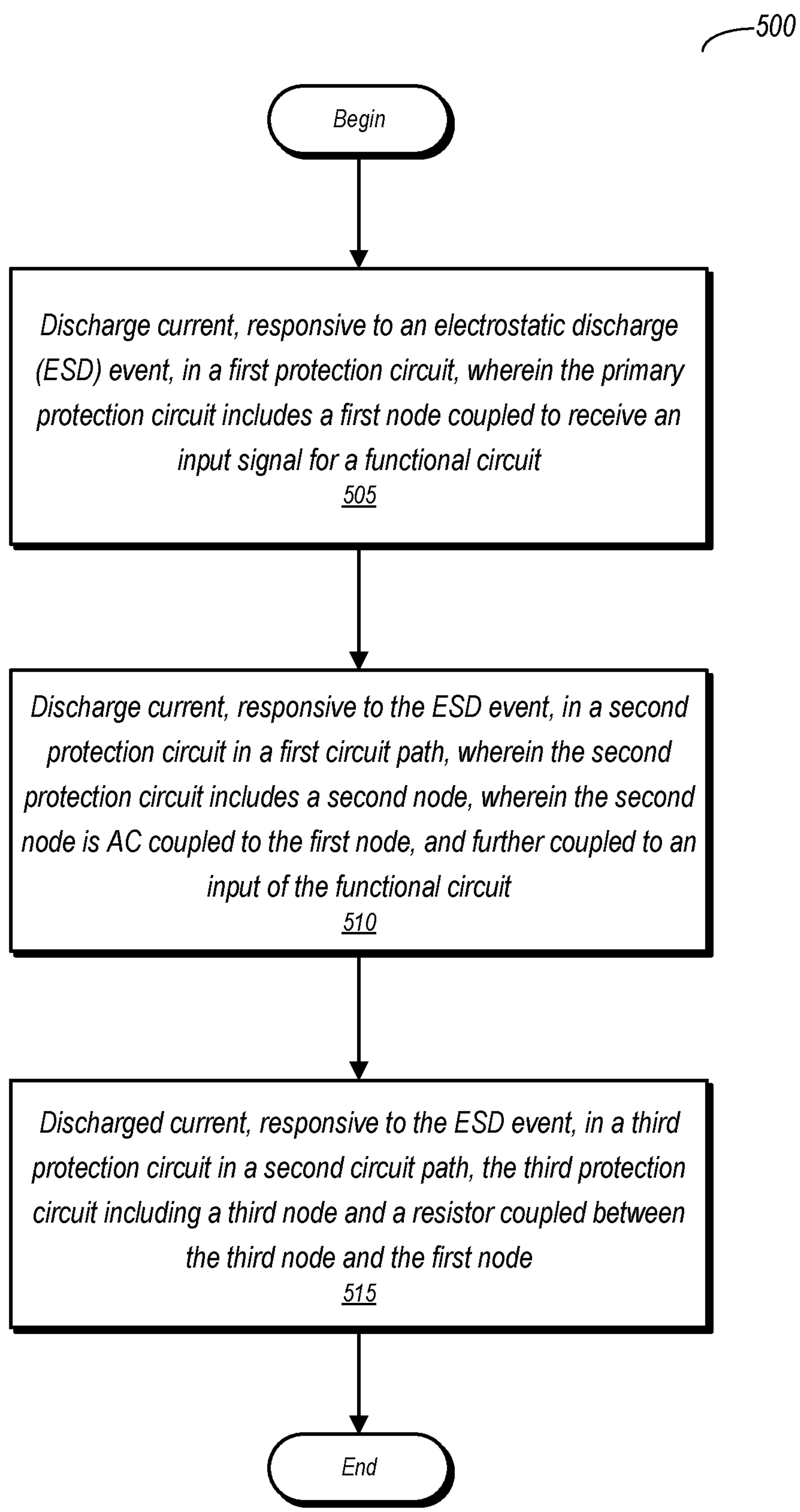
FIG. 5 is a flow diagram illustrating operation of one embodiment of an ESD protection circuit.

FIG. 5 is a method illustrating operation of an ESD protection circuit during an ESD event. Method 500 may be carried out by various embodiments of the ESD protection circuit discussed above. Embodiments of an ESD protection circuit not explicitly discussed herein but capable of carrying out method 500 may also fall within the scope of this disclosure.

Method 500 includes discharging current, responsive to an electrostatic discharge (ESD) event, in a first protection circuit, wherein the primary protection circuit includes a first node coupled to receive an input signal for a functional circuit (block 505). The first protection circuit may be, e.g., the primary protection circuit 105 shown in FIG. 1. The method further includes discharging current, responsive to the ESD event, in a second protection circuit in a first circuit path, wherein the second protection circuit includes a second node, wherein the second node is AC coupled to the first node, and further coupled to an input of the functional circuit (block 510). The second protection circuit may be equivalent to one of the secondary protection circuits 115, and may be AC coupled via a capacitor such as capacitor C1, both as shown in FIG. 1. The second protection circuit may be implemented in one of two different circuit paths of an ESD protection circuit that has multiple circuit paths (e.g., a high speed path and a low speed path). The method also includes discharging current, responsive to the ESD event, in a third protection circuit in a second circuit path, the third protection circuit including a third node and a resistor coupled between the third node and the first node (block 515). The third protection circuit may be in a second circuit path (e.g., a low speed path), separate from the first circuit path that includes the second protection circuit. The resistor may arranged in the same or similar manner to resistor R1 as shown in any of FIGS. 1-3.

In various embodiments, the method further includes activating a first shunt transistor responsive to the ESD event, wherein activation of the first shunt transistor causes current to be discharged from the second circuit path and activating a second shunt transistor responsive to activation of the first shunt transistor, wherein activation of the second shunt transistor causes current to be discharged from the first circuit path. The first and second shunt transistors may correspond to, e.g., transistors N1 and P1, respectively, of the circuit shown in FIG. 1.

Some embodiments of the method includes opening a switch (e.g., S1 in any of FIGS. 1-3) in the second circuit path responsive to the ESD event, wherein the switch is coupled between the third node and a gate terminal of the second shunt transistor.

Discharging current in the first protection circuit may include, in various embodiments of a method carried out by an ESD protection circuit, discharging current through a first (e.g., high side) diode coupled between the first node and a first voltage supply node. The second and third protection circuits may each include diodes coupled to a second voltage supply node different form the first. Accordingly, in various embodiments of the method discharging current in the second protection circuit comprises discharging current through a second diode coupled between the second node and a second voltage supply node, while discharging current through the third protection circuit comprises discharging current through a third diode coupled between the third node and the second voltage supply node.

Figure 6:
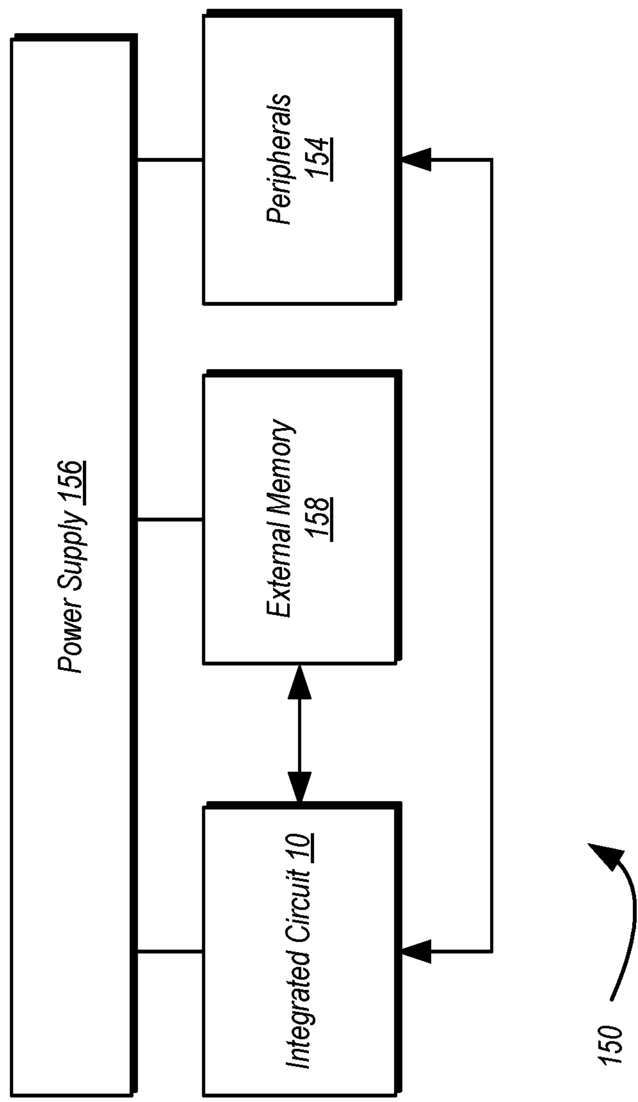
FIG. 6 is a block diagram of one embodiment of an example system.

Turning next to FIG. 6, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. In various embodiments, integrated circuit 10 may include may include one or more instances of an ESD protection circuit such as that shown above in FIGS. 1-3. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. A circuit comprising:
- an electrostatic discharge (ESD) protection circuit coupled between a first node and a second node, wherein the second node is coupled to an input of a functional circuit, wherein the ESD protection circuit comprises:
  - a first protection circuit coupled to the first node;
  - a first circuit path having a second protection circuit that is AC coupled to the first node and is further coupled to the second node;
  - a second circuit path having a third protection circuit, a resistor coupled between the first node and the third protection circuit, and a switch having a first terminal coupled to the resistor; and
  - a first shunt circuit comprising a first transistor having a gate terminal coupled to a second terminal of the switch and a source terminal coupled to the first circuit path at the second node.

2. The circuit of claim 1, further comprising a second shunt circuit having a second transistor between the second circuit path and a ground node, wherein, responsive to an ESD event, the second transistor is configured to be activated, and wherein the first transistor is configured to be activated responsive to activation of the second transistor.

3. The circuit of claim 2, wherein the second shunt circuit further comprises:
- a capacitor coupled between a voltage node and a gate terminal of the first transistor; and
- a resistor coupled between the gate terminal of the first transistor and a ground node.

4. The circuit of claim 3, wherein the second shunt circuit is configured to cause activation of the second transistor in response to the ESD event causing a voltage on the voltage node to rise, wherein activation of the second transistor causes current to be discharged from the second circuit path and further causes activation of the first transistor, wherein activation of the first transistor causes a discharge of the first circuit path.

5. The circuit of claim 1, wherein the first protection circuit includes a first diode having its anode coupled to the first node and its cathode coupled to a voltage node, and a second diode having its anode coupled to a ground node and a cathode coupled to the first node.

6. The circuit of claim 1, wherein second protection circuit includes a first diode having an anode coupled to the second node and a cathode coupled to a voltage node, and a second diode having a cathode coupled to the second node and an anode coupled to a ground node.

7. The circuit of claim 1, wherein the AC coupling is provided by a capacitor coupled between the first node and the second node.

8. The circuit of claim 1, wherein the second circuit path comprises a third node, wherein the resistor and the switch are coupled to the third node, and wherein the third protection circuit includes a first diode having an anode coupled to the third node and a cathode coupled to a voltage node, and a second diode having a cathode coupled to the third node and an anode coupled to a ground node.

9. The circuit of claim 1, wherein the switch is configured to open responsive to an ESD event.

10. The circuit of claim 1, wherein a source terminal of the first transistor is coupled to the second node and wherein a drain terminal of the first transistor is coupled to a ground node.

11. The circuit of claim 1, wherein the first protection circuit is implemented between a ground node and a first voltage node, and wherein the second and third protection circuits are implemented between the ground node and a second voltage node.

12. A method comprising:
- discharging current, responsive to an electrostatic discharge (ESD) event, in a first protection circuit, wherein the first protection circuit includes a first node coupled to receive an input signal for a functional circuit;
- discharging current, responsive to the ESD event, in a second protection circuit in a first circuit path, wherein the second protection circuit includes a second node, wherein the second node is AC coupled to the first node, and further coupled to an input of the functional circuit; and
- discharging current, responsive to the ESD event, in a third protection circuit in a second circuit path, the third protection circuit including a third node and a resistor coupled between the third node and the first node, wherein discharging in the second circuit path includes activating a first shunt transistor responsive to the ESD event, wherein activation of the first shunt transistor causes current to be discharged from the second circuit path; and
- wherein discharging current in the first circuit path comprises activating a second shunt transistor responsive to activation of the first shunt transistor, wherein activation of the second shunt transistor causes current to be discharged from the first circuit path.

13. The method of claim 12, further comprising opening a switch in the second circuit path responsive to the ESD event, wherein the switch is coupled between the third node and a gate terminal of the second shunt transistor.

14. The method of claim 13, wherein discharging current in the first protection circuit comprises discharging current through a first diode coupled between the first node and a first voltage supply node, wherein discharging current in the second protection circuit comprises discharging current through a second diode coupled between the second node and a second voltage supply node, and wherein discharging current through the third protection circuit comprises discharging current through a third diode coupled between the third node and the second voltage supply node.

15. An integrated circuit comprising:
- an electrostatic discharge (ESD) protection circuit coupled between a first node and a second node, the first node being coupled to an input pin of the integrated circuit; and
- a functional circuit having an input coupled to the second node;
- wherein the ESD protection circuit includes:
  - a primary protection circuit coupled to the first node and further coupled to a first voltage supply node and a ground node;
  - a high speed path including a first secondary protection circuit coupled to the second node and further coupled to the ground node and a second voltage supply node, wherein the high speed path further includes a first capacitor coupled between the first node and the second node;

a low speed path including a second secondary protection circuit coupled to a third node and further coupled to the ground node and the second voltage supply node, wherein the low speed path further includes a first resistor coupled between the first node and the third node; and a first shunt circuit comprising a first transistor having a gate terminal coupled to the low speed path and a source terminal coupled to the second node.

16. The integrated circuit of claim 15, wherein the ESD protection circuit further includes a second shunt circuit having a second transistor, wherein the second transistor includes a drain terminal coupled to the gate terminal of the first transistor and a source terminal coupled to the ground node, wherein the second transistor is configured to activate responsive to an increase in voltage on the second voltage supply node during an ESD event, and wherein the first transistor is configured to activate responsive to activation of the second transistor.

17. The integrated circuit of claim 16, wherein the second shunt circuit further includes:

a second capacitor coupled between the second voltage supply node and a gate terminal of the second transistor; and a second resistor coupled between the gate terminal of the second transistor and the ground node.

18. The integrated circuit of claim 15, wherein the low speed path further comprises a switch coupled between the third node and the gate terminal of the first transistor, wherein the switch is configured to open responsive to an ESD event.

19. The integrated circuit of claim 15, wherein the primary protection circuit comprises:

a first diode coupled having an anode coupled to the first node and a cathode coupled to the first voltage supply node; and a second diode coupled having a cathode coupled to the first node and an anode coupled to the ground node.

20. The integrated circuit of claim 15, wherein each of the first and second secondary protection circuits includes a respective first diode having a cathode coupled to the second voltage supply node and a respective second diode having an anode coupled to the ground node.

* * * * *

UNITED STATES PATENT AND TRADEMARK OFFICE

CERTIFICATE OF CORRECTION

PATENT NO. : 11,322,935 B2
APPLICATION NO. : 17/014894
DATED : May 3, 2022
INVENTOR(S) : Farzan Farbiz et al.

It is certified that error appears in the above-identified patent and that said Letters Patent is hereby corrected as shown below:

On the Title Page

Item (54) and in the Specification Column 1, Line 1 please delete "HIGH SPEED ESP PROTECTION CIRCUIT" and insert -- HHIGH SPEED ESD PROTECTION CIRCUIT --.

Signed and Sealed this
Fourteenth Day of February, 2023

Katherine Kelly Vidal

Katherine Kelly Vidal
*Director of the United States Patent and Trademark Office*